Jan. 9, 1940.    H. ROSENBERG    2,186,789
BEARING UNIT
Filed May 5, 1938
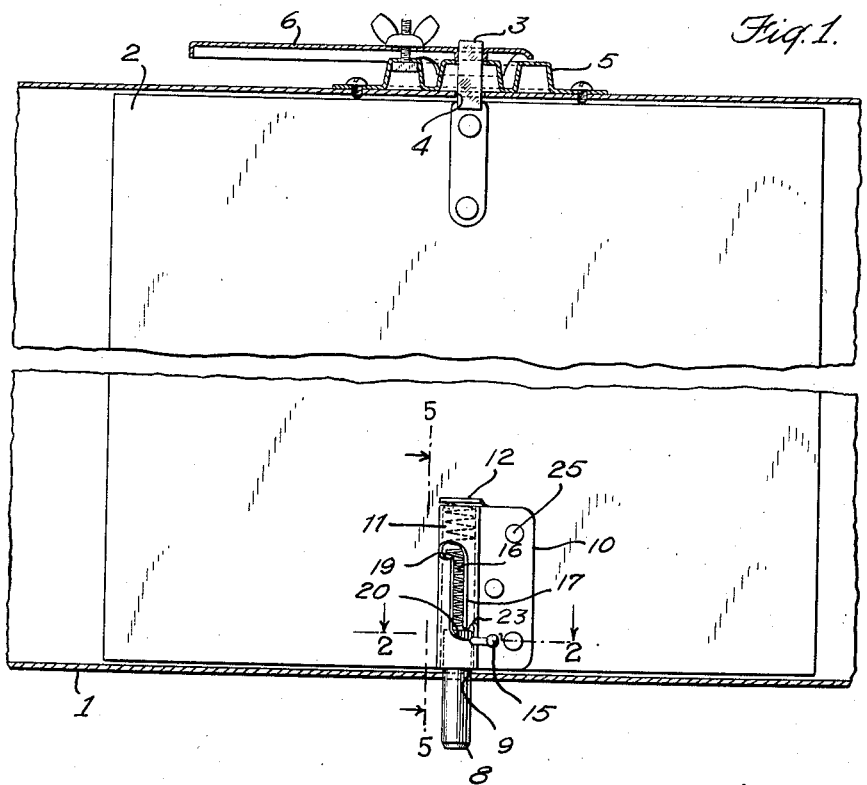
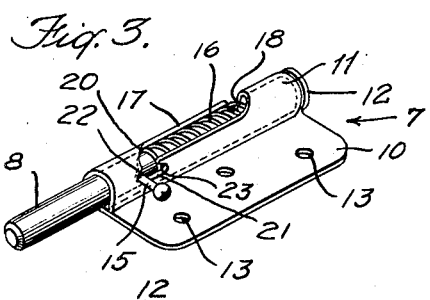
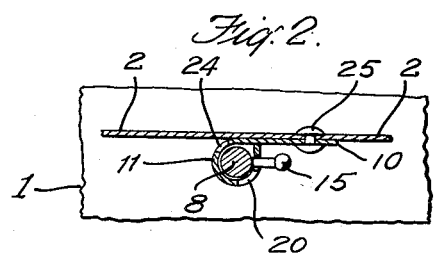
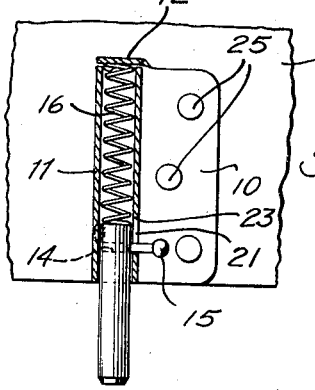
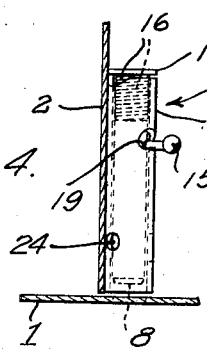
INVENTOR
HEYMAN ROSENBERG.
BY
Clarence M. Crews
ATTORNEY Patented Jan. 9, 1940

2,186,789

UNITED STATES PATENT OFFICE 2,186,789

BEARING UNIT

Heyman Rosenberg, New York, N. Y.

Application May 5, 1938, Serial No. 206,155

3 Claims. (Cl. 16—176)

This invention relates to bearing units, and more particularly to units of the kind which are adapted to be secured to a damper for rotatably mounting the damper in a fluid transmitting duct.

The invention is particularly intended for mounting dampers in flues and ventilating or air conditioning ducts. Such ducts are commonly either circular or rectangular in cross section, and may be deformed to a limited extent for facilitating the insertion and emplacement of a damper with a single protruding bearing unit attached. An installation, however, requires that a plurality of bearing members be attached to the damper to project beyond opposite edges of the damper so that pivotal mounting of the damper may be secured by lodging the bearing members in openings formed in opposite sides of the duct. It is not feasible to insert a damper with the two aligned and opposed, projecting bearing members fixed in place. The practice has commonly been resorted to in the past of affixing at least one of the damper bearing units, after the damper has been put into place within the duct. This is frequently an awkward and time consuming operation.

In accordance with the present invention, a bearing unit is provided which comprises a retractible bearing pin and a support for the retractible bearing pin which is adapted to be affixed to the damper before the damper is inserted in the duct. Provision is further made of an operating handle for the retractible bearing pin, and a slot is formed in the bearing pin support through which the bearing pin handle projects and along which it is operable.

In accordance with a salient feature of the invention, the slot is provided with an inner lateral extension which terminates in a notched portion, the arrangement being such that the bearing pin handle can be lodged in the notch to retain the bearing pin fully retracted during the insertion of the damper into the duct.

In accordance with a further important feature of the invention, the bearing pin is provided with a transverse bore in which the handle is secured in any suitable way, as by means of a driving fit, the arrangement being such that the bearing pin can be inserted into its support after the support has been fully formed, and a handle can thereafter be assembled and attached to the bearing pin. By virtue of this arrangement, it is possible to make the entire bearing pin support of a simple one piece sheet metal stamping.

In accordance with a further feature of the invention, the slot in which the bearing pin handle operates, is formed with an outer lateral extension which terminates in a notched portion. When the bearing pin handle is released from the notch that holds the bearing pin in its retracted position, the bearing pin is thrust outward under spring pressure and through a cam formation of the slot, is directed into the notch of the outer lateral extension. The notch serves to hold the bearing pin handle out of line with the main portion of the slot so that after installation likelihood of accidental dislodgment of the bearing pin from the duct wall is minimized. The outer lateral extension of the slot also includes a second notch in line with the first into which the bearing pin handle will be thrust if the bearing pin is pushed inward from outside the duct. This second notch arrests inward movement of the bearing pin with a portion of the pin projecting through the duct wall. It also serves to prevent unintended or accidental rotation of the bearing pin and hence guards against further inward displacement of the bearing pin to a position in which it would clear the duct wall.

It is a feature of the invention that the inner and outer seating notches of the slot enable the bearing pin handle to be lodged out of the way during the operation of attaching the bearing unit to the damper.

Other objects and advantages will hereinafter appear.

In the drawing forming part of this specification, and illustrating a practical and advantageous structure embodying the invention;

Fig. 1 is a fragmentary, sectional view of a duct having a damper and damper bearing therein which embody features of the invention;

Fig. 2 is a fragmentary, sectional view taken on the line 2—2 of Fig. 1 looking in the direction of the arrows;

Fig. 3 is a perspective view of the bearing unit of Fig. 1;

Fig. 4 is a vertical, sectional view of the bearing unit of Fig. 1 shown applied to a fragment of the damper; and Fig. 5 is a fragmentary, sectional view taken upon the line 5—5 of Fig. 1, but showing the retractible bearing pin in retracted position.

A duct 1 is shown in Fig. 1 as having a damper blade 2 mounted in it. The damper blade 2 has affixed to it a stem or bearing member 3 which extends permanently beyond one edge of the damper and through a hole 4 formed in the upper duct wall. The stem 3 is square and is designed to pass through a dial plate 5 and to cooperate with a handle 6 mounted upon the upper side of the duct. The dial plate and handle structure are desirably of the construction disclosed in my pending application Serial No. 159,703, filed August 18, 1937, for Damper control device, which has become Patent No. 2,129,505, dated September 6, 1938.

The damper blade 2 also has affixed to it a bearing unit 7 which includes a bearing pin 8 in the form of a retractible plunger. The bearing pin 8 passes through a circular opening 9 in the lower wall of the duct and is mounted upon the damper blade in position to be in alignment with the stem or bearing member 3.

The bearing pin 8 is carried by a one piece sheet metal support which is formed to provide an attaching plate portion 10, a round barrel portion 11 and an end barrel wall 12. The attaching plate portion 10 is provided with fastener receiving openings 13 through which rivets or case hardened steel screws may be passed for attaching the plate 10 to the damper.

The bearing pin 8 is formed with a transverse bore 14 into which a bearing pin handle 15 is driven to permanently secure the handle to the bearing pin.

A coil spring 16 is housed within the barrel portion 11. The spring 16 bears at one end against the end wall 12 of the barrel and at the other end against the bearing pin 8, so that the tendency of the spring is to force the bearing pin outward to a position as illustrated in Figs. 1, 3 and 4.

The barrel wall 11 is provided with a slot 17 through which the handle 15 projects, and along which it is operable. The slot, at its inner end, includes a lateral extension 18 which terminates in a notch 19. The bearing pin handle may be forced inward to retract the bearing pin completely within the barrel and may be lodged in the notch 19 to retain the bearing pin in retracted position. The parts are retained in this position during the insertion of the damper blade into the duct. After the damper blade has been inserted, the bearing member 3 has been passed through the opening 4, and the bearing pin 8 has been aligned with the opening 9, the bearing pin handle 15 is turned out of the slot extension 18 into line with the main or longitudinally extending portion of the slot 17. The spring 16 thereupon forces the bearing pin 8 outward to project it through the opening 9, as illustrated in Fig. 1.

The slot 17 is formed with a cam portion 20 which forces the bearing pin handle 15 around into an outer lateral extension 21 of the slot 17. The force of the spring 16 causes the bearing pin handle to become seated in a notched portion 22 of the outer slot extension 21 as illustrated in Fig. 3. This is the normal position of the installed parts.

The slot extension 21 is formed with a second notched portion 23 opposite the notched portion 22 and in line therewith. Should the bearing pin be unintentionally thrust inward after it has been installed, the base of the notch 23 will serve to limit such inward movement to a position in which the bearing pin 8 still projects through the hole 9. The notch 23 will prevent accidental rotation of the bearing pin 8, and hence will prevent accidental dislodgment of the bearing pin 8 from the hole 9.

It will be seen that the bearing unit 7, with its retractible plunger 8, can be attached to the damper blade 2 before insertion of the damper blade 2 in the duct, and that the bearing unit 7 will not interfere in any way with such insertion of the damper blade nor require any attention whatever from the mechanic during such insertion. In the case of a duct which is rectangular in cross section, it is a simple matter to insert the damper blade in a tilted position so that the projecting stem or bearing member 3 can be passed into line with the opening 4 and then worked through the opening 4. In the case of a duct which is circular in cross section, it is necessary to spring the duct; that is to say, it is necessary to deform the duct during the inserting operation sufficiently to permit the damper blade with the projecting stem 3 to be inserted. The fact that the bearing unit 7 does not include any projecting member during this operation and that it does not require any attention from the mechanic, is a point of great advantage, since it obviates the necessity of the mechanic's using a hand to hold the pin 8 retracted.

A bearing unit of the kind shown and described is adapted to be mounted upon the face of the damper blade illustrated, adjacent the left hand edge of the blade or at substantially any point intermediate the right and left hand edges of the blade. It is sometimes necessary that the axis of the damper be located substantially in line with the right hand edge of the damper blade. In that case the bearing unit will be turned around and affixed to the opposite face of the damper blade. The stem 3 will always be attached in alignment with the bearing pin 8, and hence will be mounted upon the same face of the damper blade as the support for the pin 8.

In addition to the advantages of the retractible bearing unit that have already been referred to in connection with the installation of the damper in the duct, the unit embodies novel and useful characteristics for facilitating the assembly of the parts of the unit and for facilitating the attachment of the unit to the damper blade.

The fact that the handle 15 is driven into a transverse bore of the bearing pin 8 enables these members to be assembled and united with one another after the spring 16 has been placed in the barrel and after the bearing pin 8, without the handle, has been placed in the barrel. The barrel is provided with an opening 24 diametrically opposite to a portion of the slot 17 to facilitate jigging of the bearing pin at the handle attaching operation. By inserting the bearing pin in the barrel, and impaling it upon a retractible jig pin, the bearing pin is fixed against movement by the spring 16 and the bore 14 is aligned with the driving tool whereby the handle 15 is driven into place.

The fact that this assembly of the bearing pin with its handle can be, and is, effected after the bearing pin has been located in the barrel, enables the bearing pin support comprising the elements 10, 11 and 12 to be fully formed as a one piece, sheet metal, stamping of extremely simple, economical, and sturdy construction.

It will be observed that in the normal position of the parts as illustrated in the drawing, the bearing pin handle lies closely adjacent to the attaching plate 10. This is a desirable position for the handle to occupy after the parts have been installed. This position of the handle, however, would be an interfering position at the time when the outer rivet 25 is applied for securing the bearing unit to the damper blade. It will be observed, however, that the handle 25 can be lodged in the notch 19 of the barrel 11 during such operation. This not only locates the handle far away from the outer rivet, but it also swings the handle around at an inclination of more than 90° to the attaching plate 10. Thus, the attaching plate can be freely clamped and freely worked upon without being in any way obstructed by the handle 15.

I have described what I believe to be the best embodiments of my invention. I do not wish, however, to be confined to the embodiments shown, but what I desire to cover by Letters Patent is set forth in the appended claims.

I claim:

1. A bearing unit adapted for attachment to a damper blade, comprising a bearing pin in the form of a plunger, a support for the bearing pin including a plunger barrel portion and an attaching plate portion, a spring in the barrel for projecting the bearing pin outward to an operating position, and a handle fixed on the bearing pin, said barrel having a slot in its wall through which the bearing pin handle projects and along which it is operable, and said slot having a lateral extension at its outer end which terminates in a notched portion in which the bearing pin handle is seated by the spring in an operative position of the bearing pin, said notch normally restraining the handle and holding the bearing pin against rotation relative to the barrel, and said slot including a cam portion for directing the handle into the notched portion of the outer lateral slot extension as the bearing pin is projected outward by the spring.

2. A bearing unit adapted for attachment to a damper blade, comprising a bearing pin in the form of a plunger, a support for the bearing pin including a plunger barrel portion and an attaching plate portion, a spring in the barrel for projecting the bearing pin outward to an operating position, and a handle fixed on the bearing pin, said barrel having a slot in its wall through which the bearing pin handle projects and along which it is operable, and said slot having an inner lateral extension terminating in a notch for receiving the pin handle and restraining it against the force of the spring in position to retain the bearing pin in its retracted position, said slot having an outer lateral extension which terminates in a notched portion in which the bearing pin handle is seated by the spring in the operative position of the bearing pin, said notched portion normally restraining the handle and holding the bearing pin against rotation relative to the barrel, and said outer slot extension having a second notched portion opposite the first for receiving the bearing pin handle and detaining it to prevent accidental rotation of the bearing pin relative to the barrel when the bearing pin is thrust inward.

3. A bearing unit adapted for attachment to a damper blade, comprising a bearing pin in the form of a plunger, a support for the bearing pin including a plunger barrel portion and an attaching plate portion, a spring in the barrel for projecting the bearing pin outward to an operating position, and a handle fixed on the bearing pin, said barrel having a slot in its wall through which the bearing pin handle projects, said slot having an outer lateral extension which terminates in a notched portion in which the bearing pin handle is seated by the spring in the operative position of the bearing pin, said notched portion normally restraining the handle and holding the bearing pin against rotation relative to the barrel, and said slot extension having a second notched portion opposite the first for receiving the bearing pin handle and detaining it to prevent accidental rotation of the bearing pin relative to the barrel when the bearing pin is thrust inward.

HEYMAN ROSENBERG.